UNITED STATES PATENT OFFICE.

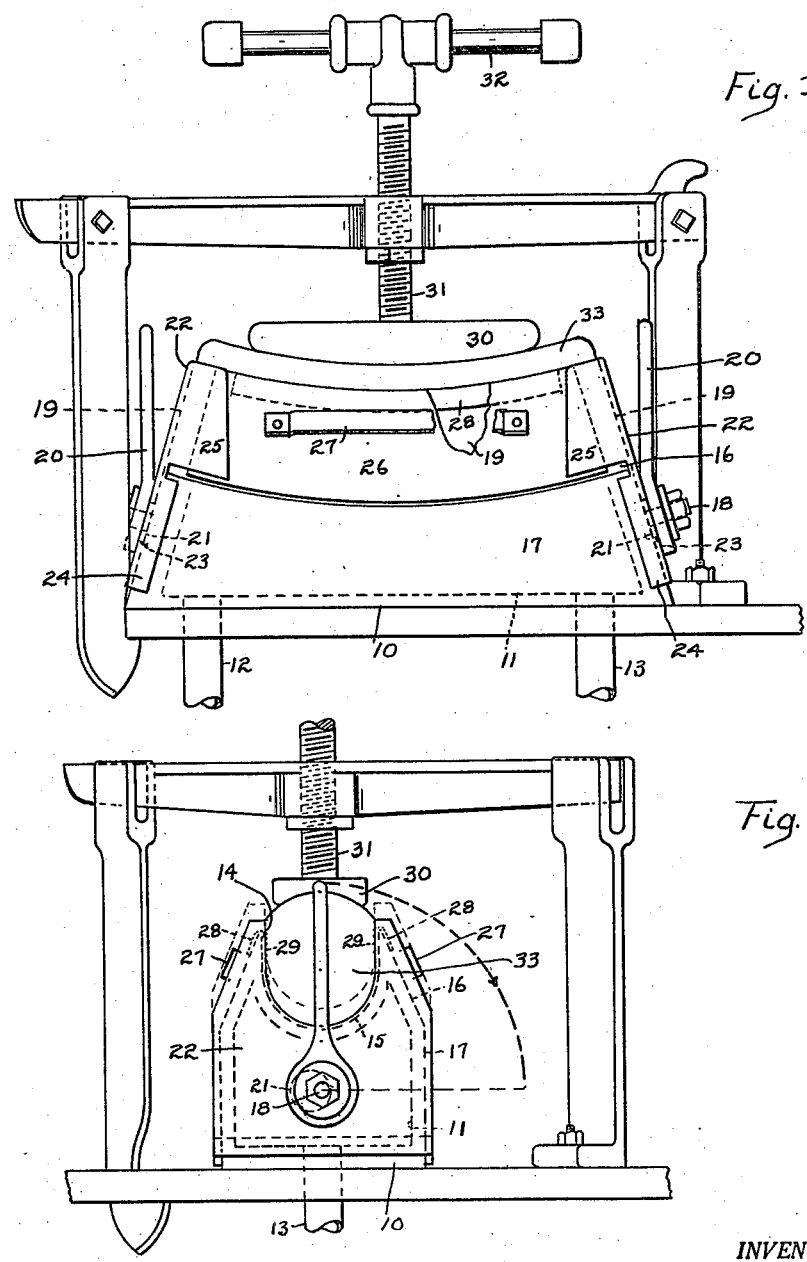

ALBERT L. MURRAY, OF AUBURN, INDIANA.

PROCESS OF MANUFACTURING AUTOMOBILE-TIRE PATCHES.

1,311,134.   Specification of Letters Patent.   Patented July 22, 1919.

Application filed March 15, 1918. Serial No. 222,616.

*To all whom it may concern:*

Be it known that I, ALBERT L. MURRAY, a citizen of the United States, residing at Auburn, in the county of Dekalb and State of Indiana, have invented new and useful Improvements in Processes of Manufacturing Automobile-Tire Patches, of which the following is a specification.

The invention relates to the manufacture of patches for automobile tires and particularly to methods of vulcanizing and shaping such patches. It is desirable that patches for use in temporarily repairing a tire casing shall conform to the contour of the casing so as to snugly fit the same when applied. Prior to my invention it was difficult in forming such patches from a flat unit built up of several plies of rubberized fabric to prevent separation of the plies and the formation of wrinkles therein. The only previously known means of preventing the separation of the plies or the forming of wrinkles therein has been in the building of the raw patch to use a much greater proportion of costly new rubber in rubberizing the fabric than is necessary in the finished article or to expend excessive time and labor in attempting to iron out the wrinkles in the finished article, which wrinkles must be removed to prevent injury to the patch or to the inner tube in use.

The object of my invention is to provide a novel and simple method by which a patch may be shaped and vulcanized with great rapidity and with entire absence of separation or wrinkling of the plies thereof.

I accomplish the object above stated by stretching the raw patch into contact with a heated mold, and the preferred method of performing the stretching operation is as follows:

I provide a mold having a cavity therein whose wall corresponds in contour to the contour of the size of tire for which the patch is to be made. I then place in the cavity a patch built up in the raw state of the desired number of plies of rubberized fabric and press the ends thereof into tight contact with the wall of the cavity. The latter wall is hot so that the ends of the patch adhere to the same, and since the bottom of the cavity is concave both longitudinally and laterally and the patch it flat, the ends of the patch only adhere to the wall of the cavity while the remainder of the patch is free of the wall. I then draw the flaps at the side edges of the patch over onto the outer wall of the mold and draw downwardly on the same and secure them to the wall in their extended position. I then insert a suitable pliable member, such as a sand bag, within the patch and apply pressure to the member to force the patch into contact with the wall of the cavity throughout the length and width of the patch. This operation stretches the patch both longitudinally and laterally since its side edges and ends are previously secured to the inner and outer walls of the mold and can not move under the force applied to the sand bag or other member. The patch is now permitted to remain in the heated mold a few minutes until it is vulcanized, whereupon it is withdrawn and the operation repeated upon another raw patch. In this manner a raw patch is formed and vulcanized with great rapidity and since it is stretched into conformity to the inner wall of the mold there is no possibility of separating the plies or of forming wrinkles at any point in the patch.

In practising the invention I have performed the operations in the mold illustrated in the accompanying drawings, in which Figure 1 is a side elevational view of the mold with a patch stretched into contact with the wall of the cavity and Fig. 2 an end view of the same.

In the device illustrated in the drawings the mold 10 has a steam jacket 11 to which steam is supplied by pipes 12 and 13 for heating the mold. Recess or cavity 14 is formed in the mold and is adapted to receive the patch to be vulcanized and shaped. The bottom wall 15 of the cavity is concave both transversely and longitudinally to correspond to a pneumatic tire casing. The upper portions 16 of the outer walls 17 of the mold are beveled or inclined inwardly toward their upper edges, and their edges are concaved longitudinally similarly to bottom 15 of the cavity. A fixed pin 18 projects outwardly from each end wall 19 of the mold and upon each pin is revolubly mounted a lever 20 having a cam 21 operative in an aperture 23 formed in plate 22 loosely engaged on each end wall, the cam being adapted to raise and lower the plate according as the lever is rocked. Lateral flanges 24 on each plate engage the lower portions of outer walls 17 of the mold, and flanges 25 on each plate are inclined to correspond to the inclination of portions 16 of walls 17, the latter flanges being sufficiently spaced from portions 16 to permit of the insertion of the ends of spring plates 26, which plates are provided with handles 27 and are slightly curved longitudinally so that when their ends are engaged under flanges 25 with their convex surfaces facing the sides of the mold, they will be under tension, their central portions gripping tightly upon flaps 28 of patch 29. When plates 22 are drawn down by operating levers 20 they in turn draw down on plates 26 which in turn draw down on flaps 28 and tightly secure the latter to the walls of the mold. A plunger 30 supported on screw 31 having an operating handle 32 serves to compress sand bag 33 into contact with patch 29 and to force and stretch the patch into contact with the wall of the cavity.

To secure the ends of the patch to the wall of the cavity I use a suitable means such as a suitable tightly packed sand bag and perform the operation by hand. I then remove the sand bag and draw the flaps of the patch over onto the portions 16 of outer walls 17; then install plates 26 and rock levers 20 to tightly engage the plates thereon; then insert a suitable loosely packed sand bag and lower plunger 30 to exert the required pressure upon the latter bag. After a few minutes the plunger is released, and the sand bag and patch are removed and the operation is repeated upon another raw patch. The operation is very quickly performed and the finished patch is entirely free from separated plies or wrinkles.

What I claim is:

1. The method of shaping and vulcanizing tire patches which consists first in laying a raw patch into a hot mold having the desired shape of concavity, then applying a tightly packed sand bag to the patch and compressing it to cause the ends of the patch to adhere to the wall of the concavity, then removing the sand bag, then securing the side edges of the patch to the mold and then applying a loosely packed sand bag to the patch and compressing it to cause the remainder of the patch to stretch into contact with the wall of the mold.

2. The method of shaping and vulcanizing tire patches which consists first in laying a raw patch into a hot mold having a cavity therein with its wall both longitudinally and transversely concave, then pressing down a suitable sand bag to cause the ends of the patch to adhere to the wall of the concavity, then removing the sand bag, then securing the side edges of the patch to the wall of the mold, then applying a second sand bag having greater flexibility than the first named sand bag and pressing it down on the patch to cause the remainder of the patch to stretch into contact with the wall of the cavity and finally subjecting the patch to heat while it is held in its stretched condition.

In witness whereof I hereunto subscribe my name this 28th day of February, 1918.

ALBERT L. MURRAY.

Copies of this patent may be obtained for five cents each, by addressing the "Commissioner of Patents, Washington, D. C."